United States Patent [19]
Nakanishi

[11] Patent Number: 6,017,623
[45] Date of Patent: Jan. 25, 2000

[54] COVER TAPE FOR PACKAGING ELECTRONIC COMPONENTS

[75] Inventor: Hisao Nakanishi, Amagasaki, Japan

[73] Assignee: Sumitomo Bakelite Company Limited, Tokyo, Japan

[21] Appl. No.: 09/068,968

[22] PCT Filed: Nov. 18, 1996

[86] PCT No.: PCT/JP96/03376

§ 371 Date: May 21, 1998

§ 102(e) Date: May 21, 1998

[87] PCT Pub. No.: WO97/19140

PCT Pub. Date: May 29, 1997

[30] Foreign Application Priority Data

Nov. 22, 1995 [JP] Japan ................................. 7-304612

[51] Int. Cl.[7] ........................................................ B32B 7/12
[52] U.S. Cl. .................... 428/349; 428/354; 428/355 EN
[58] Field of Search ...................... 428/349, 354, 428/355 EN

[56] References Cited

U.S. PATENT DOCUMENTS 5,208,103  5/1993  Miyamoto et al. .

FOREIGN PATENT DOCUMENTS 0 520 515  12/1992  European Pat. Off. .
61-12936  10/1986  Japan .

*Primary Examiner*—Christopher Raimund
*Attorney, Agent, or Firm*—Browdy and Neimark

[57] ABSTRACT

For solving a problem of large dependency of peel-off strength upon sealing conditions, a problem of change of various properties with the lapse of time under storing circumstances, a delamination problem, an agglomerate problem and a transparency problem, there is provided a cover tape for packaging electronic components which has a stable peel-off strength and is composed of an outer layer consisting of a biaxially oriented film of any one of polyester, polypropylene and nylon; an intermediate layer consisting of a mixture comprising polyethylene as the main component; and a heat sealant layer consisting of a mixture of a thermoplastic resin and a filler.

3 Claims, 1 Drawing Sheet

COVER TAPE FOR PACKAGING ELECTRONIC COMPONENTS

TECHNICAL FIELD

This invention relates to a cover tape heat-sealable sealable to a plastic carrier tape having storing pockets formed therein, which carrier tape is one of the packages having such a function that when electronic components are stored, transported or mounted, the electronic components are protected from contamination, and arranged and taken out for mounting them on an electronic circuit substrate.

BACKGROUND ART

Recently, surface mount electronic components such as IC, transistor, diode, condenser, piezoelectric element resistor and the like have been packed into a package composed of a plastic carrier tape having successively formed therein emboss-molded pockets into which the electronic components can be received in conformity with the shapes of them, and a cover tape heat-sealable to the carrier tape, and then supplied. The electronic components packed are automatically taken out from the package after the cover tape has been peeled from the carrier tape, and then surface mounted on an electronic circuit substrate.

The strength for peeling the cover tape from the carrier tape is called "peel-off strength", and when this strength is too low, there is such a problem that the cover tape gets off during the transportation of the package and the electronic components packed fall off. On the other hand, when the strength is too high, there has been caused such a phenomenon that the carrier tape vibrates when the cover tape is peeled and the electronic components jump out of the storing pockets just before they are mounted, that is, a jumping trouble has been caused.

The mechanism by which the cover tape now on the market peels from the carrier tape is classified into three types of interfacial peeling type, transfer-peeling type and cohesive failure type. The interfacial peeling type refers to such a type that the cover tape and the carrier tape are peeled from each other at the sealing face, the transfer peeling type refers to such a type that the bonding layer per se is transferred to the carrier tape during the peeling, and the cohesive failure type refers to such a type that a layer different from the bonding layer or the bonding layer per se (the two being referred to hereinafter as the cohesive failure layer) is broken to cause peeling. Each of these types has both merits and demerits; however, when they are compared only in respect of the state in which the cover tape sealed to the carrier tape is peeled, the interfacial peeling type tends to be affected by the shape, material and properties of the carrier tape because the sealing face and the peeling face are the same, and hence the peel-off strength tends to become instable.

In the case of the transfer-peeling type, the bonding layer must be a thin film in view of the mechanism and the so-called heat-sealing lacquer must be used. Therefore, the peel-off strength tends to become sensitive to sealing temperature, and hence sealing conditions for a suitable peel-off strength are hardly obtained.

In the case of the cohesive failure type, the sealing face and the peeling layer are different, and hence the dependency of the peel-off strength upon the sealing conditions is low. Also, the cohesive failure type has such a great advantage that the peel-off strength is not affected by the shape, material and properties of the carrier tape. However, in some cases, during the peeling, the cohesive failure layer is affected by a layer other than the cohesive failure layer including the bonding layer and interfacial peeling takes place without causing cohesive failure. Also, it is difficult to decide the position at which the cohesive failure layer is broken, and hence the cohesive failure layer remains on the surface of the carrier tape during the peeling and there is brought about such a state that the contents cannot be taken out.

The cohesive failure layer per se is designed so as to be easily broken, and hence in many cases, it is composed of a mixture of a plurality of resins which are hardly miscible with one another and these resins are not mixed uniformly. This results in a deterioration of the transparency of the cover tape and in a disadvantage due to agglomerates in some cases. Also, in such uses, a resin inferior in heat resistance is contained in the resin mixture in some cases. For these reasons, the agglomerates or degradation products appear during the formation of the cohesive failure layer and decrease the productivity in many cases. For example, Japanese Patent No. 1,347,759 (Applicant: UCB Societe Anonyme) recites in claim 5 a blend of polyethylene, polystyrene and an elastomeric styrene-butadiene-styrene or styrene-isoprene-styrene block copolymer, and when the blend is used to try the formation of the cohesive failure layer, the butadiene or isoprene component causes polymerization reaction when the processing temperature exceeds 200° C. to produce an agglomerate, resulting in a remarkable decrease of the production yield.

DISCLOSURE OF THE INVENTION

The object of this invention is to obtain such a cover tape that the peel-off strength does not depend upon sealing temperature when the cover tape is peeled from a carrier tape, the change of various properties with the lapse of time under the storage circumstances is small and the sealability is stable, by utilizing the mechanism of peeling due to cohesive failure.

According to this invention, there is provided a cover tape for packaging electronic components which cover tape is heat sealable to a plastic carrier tape, characterized in that the cover tape is composed of a biaxially oriented film of any one of polyester, polypropylene and nylon; a heat sealant layer consisting of a mixture of 100 parts by weight of a thermoplastic resin having a softening point of 40° C. to 130° C. and 1 to 60 parts by weight of a filler having a particle size of 0.2 to 20 µm; and an intermediate layer comprising polyethylene as the main component provided between the biaxially oriented film and the heat sealant layer.

BRIEF DESCRIPTION OF THE DRAWINGS

In FIGS. 1 and 2, 1 refers to a cover tape, 2 to a biaxially oriented film, 3 to an intermediate layer, 4 to a heat sealant layer, 5 to a portion to be heat-sealed and 6 to a carrier tape.

BEST MODE FOR CARRYING OUT THE INVENTION

In preferable embodiments of the cover tape for packaging electronic components of this invention, the biaxially oriented film as the outer layer has a thickness of 5 to 30 µm; the intermediate layer has a thickness of 5 to 50 µm and is composed of a mixture of 100 parts by weight of a polyethylene having a melt flow rate of 10 to 30 g/10 min and 5 to 100 parts by weight of a polystyrene having a melt flow rate of 10 to 30 g/10 min, or a mixture obtained by adding to the above mixture 1 to 50 parts by weight of at least one member selected from the group consisting of a hydrogenated styrene-butadiene-styrene block copolymer having a melt flow rate of 30 to 250 g/10 min and a hydrogenated styrene-isoprene-styrene block copolymer having a melt flow rate of 30 to 250 g/10 min; the heat sealant layer has a thickness of 0.2 to 3 gm and is composed of a mixture of 100 parts by weight of a polymethacrylate having a softening temperature of 40 to 130° C. or a vinyl chloride-vinyl acetate copolymer having a softening temperature of 40 to 130° C. and 1 to 60 parts by weight of a filler having a particle size of 0.2 to 20 µm which is composed of at least one member selected from the group consisting of silica, talc, calcium carbonate, clay, polyethylene particles, cross-linked acrylic resin particles and cross-linked styrene resin particles; and the pealing strength between the cover tape and the carrier tape is 10 to 120 g/mm of seal width.

Figure 1:
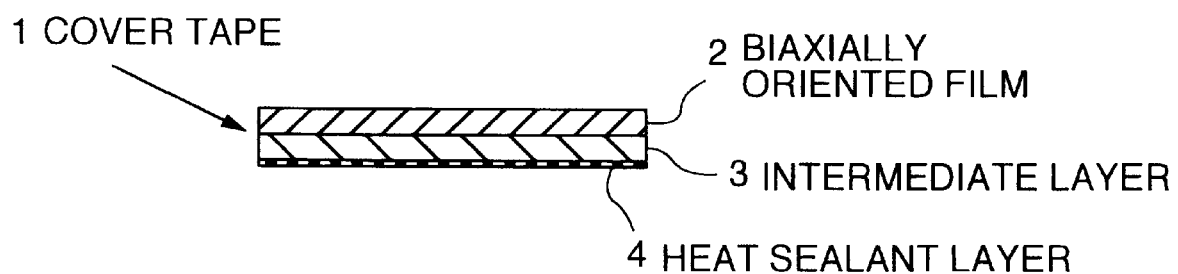
FIG. 1 is a cross-sectional view showing the layer constitution of the cover tape of this invention.
Figure 2:
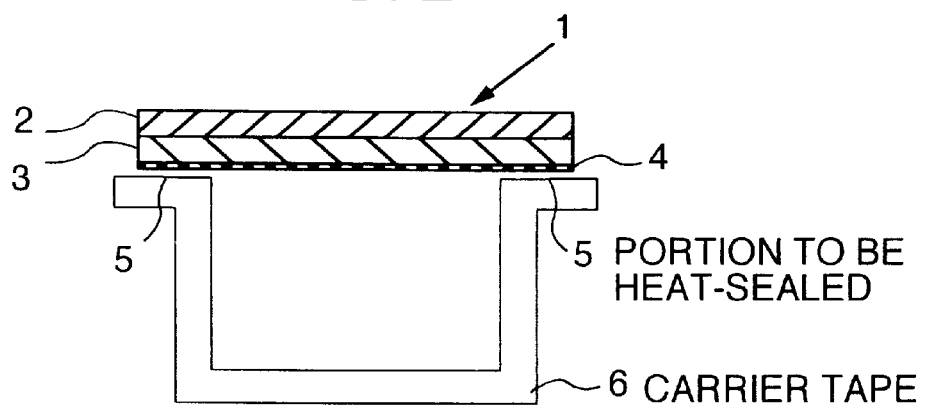
FIG. 2 is a cross-sectional view showing the state in which the cover tape of this invention is bonded to a carrier tape.

Referring to FIG. 1, the constituents of the cover tape 1 of this invention are explained. The outer layer 2 is a biaxially oriented film of any one of polyester, polypropylene and nylon and is a transparent, highly rigid film having a thickness of 5 to 30 µm. When the thickness is less than 5 µm, the rigidity is lost and the cover tape tends to be broken. When the thickness exceeds 30 µm, the film is too hard and the seal becomes instable.

In order to enable the cohesive failure to take place, the intermediate layer 3 is a film having a thickness of 5 to 50 µm composed of a mixture of 100 parts by weight of a polyethylene having a melt flow rate of 10 to 30 g/10 min and 5 to 100 parts by weight of a polystyrene having a melt flow rate of 10 to 30 g/10 min, or a mixture of 100 parts by weight of a polyethylene having a melt flow rate of 10 to 30 g/10 min, 5 to 100 parts by weight of a polystyrene having a melt flow rate of 10 to 30 g/10 min and 1 to 50 parts by weight of at least one member selected from the group consisting of a hydrogenated styrene-butadiene-styrene block copolymer having a melt flow rate of 30 to 250 g/10 min and a hydrogenated styrene-isoprene-styrene block copolymer having a melt flow rate of 30 to 250 g/10 min. The intermediate layer is preferably prepared by an extrusion-laminating method because this method is inexpensive and desirable from a hygienic point of view.

When the melt flow rate of the polyethylene is less than 10 g/10 min or the melt flow rate of the polystyrene is less than 10 g/10 min, or when the melt flow rate of the hydrogenated styrene-butadiene-styrene block copolymer or the hydrogenated styrene-isoprene-styrene block copolymer is less than 30 g/10 min, the malleability of a film formed by the extrusion-laminating method is small and a suitable film formation is impossible. Moreover, when the melt flow rate of the polyethylene is more than 30 g/10 min or the melt flow rate of the polystyrene is more than 30 g/10 min, or when the melt flow rate of the hydrogenated styrene-butadiene-styrene block copolymer or hydrogenated styrene-isoprene-styrene block copolymer is more than 250 g/10 min, the necking is violent and hence a suitable film formation is impossible.

The polystyrene content is less than 5 parts by weight per 100 parts by weight of the polyethylene, no cohesive failure takes place in the intermediate layer. When it is more than 100 parts by weight, the miscibility becomes low and the film formation becomes impossible. When the content of the hydrogenated styrene-butadiene-styrene block copolymer and/or the hydrogenated styrene-isoprene-styrene block copolymer is less than 1 part by weight per 100 parts by weight of the polyethylene, the visible light transmittance of the film becomes 75% or less. When the content is more than 50 parts by weight, a variation in film thickness is caused in the extrusion-lamination. When the thickness of the intermediate layer is adjusted to less than 5 µm by the extrusion-laminating method the variation in thickness becomes large and a suitable peel-off strength is not obtained. When the thickness is more than 50 µm, such a phenomenon that the cohesive layer remains on the surface of the carrier tape during the peeling tends to take place.

The outer layer and the intermediate layer may be laminated through a bonding layer of a thermosetting type such as an isocyanate type, an imine type or the like or a thermoplastic type such as polyethylene or the like for the purpose of increasing the laminate strength of the two layers.

Preferably the heat sealant layer 4 has a thickness of 0.2 to 3 µm and is composed of a mixture of 100 parts by weight of a polymethacrylate or a vinyl chloride-vinyl acetate copolymer and 1 to 60 parts by weight of a filler having a particle size of 0.2 to 20 µm composed of at least one member selected form the group consisting of silica, talc, calcium carbonate, clay, polyethylene particles, cross-linked acrylic resin particles and cross-linked styrene resin particles. Since this layer is a very thin film, it is most preferably prepared by a gravure coating method. As the polymethacrylate, there is mentioned, for example, methyl methacrylate-butyl methacrylate copolymer. The softening temperature of the copolymer can be varied in the range of from 40° C. to 130° C. by changing the copolymerization ratio. As the vinyl chloride-vinyl acetate copolymer, there are mentioned, for example, Dicseal A-100Z series (manufactured by DAINIPPON INK & CHEMICALS, INC.). The softening temperatures thereof vary depending upon the product number. When the softening temperature is less than 40° C., there is a possibility that blocking is caused when the cover tape is stored, and when the softening temperature exceeds 130° C., it is necessary to elevate the temperature for heat sealing and in this case there is a fear that the carrier tape per se may be broken.

When the particle size of the filler is less than 0.2 µm or the content of the filler is less than 1 part by weight, there is caused the so-called blocking phenomenon that when the cover tape is stored under high temperature circumstances of not less than 60° C. the rewinding becomes impossible. Moreover, when the particle size of the filler is more than 20 µm or the content of the filler is more than 60 parts by weight, the transparency becomes bad and the visible light transmittance becomes less than 75%. When the thickness of the heat sealant layer is less than 0.2 µm, it is very difficult to make the thickness constant and it becomes impossible to obtain a stable peel-off strength. When the thickness is more than 3 µm, cohesive failure takes place in the heat sealant layer and the peel-off strength becomes instable as well.

In order to improve the antistatic effect, both sides of the outer layer, namely the biaxially oriented film may be provided with an antistatic treatment layer or an electroconductive layer.

The resin of the intermediate layer is so constituted that the bonding strength between the cover tape 1 and the carrier tape 6 becomes 10 to 120 g/mm of seal width, preferably 10 to 70 g/mm of seal width. When the peel-off strength is lower than 10 g, there is such a problem that the cover tape gets off during the transportation of the package and the electronic components contained fall out. On the contrary, when the peel-off strength is more than 120 g, the carrier tape is vibrated when the cover tape is peeled, and such a phenomenon that the electronic components are jumped out of the storing pockets just before the mounting thereof, namely a jumping trouble, is caused. According to this invention, there can be obtained the desired properties that the dependency upon the sealing conditions is low and the change of the peel-off strength with the lapse of time under storage circumstances is small.

Moreover, the cover tape is so constituted that the visible light transmittance becomes not less than 75%, preferably not less than 80%, and hence the electronic components sealed into the carrier tape can be confirmed visually or mechanically. When the above transmittance is less than 75%, it is difficult to confirm the electronic components in the carrier tape.

Examples are shown below to explain this invention in more detail; however, they are merely illustrative and not limitative.

EXAMPLES 1 TO 7 AND COMPARATIVE EXAMPLES 1 TO 6

Using the formulation shown in Table 1 or Table 2, on a biaxially oriented polyester film having a thickness of 25 μm, an intermediate layer having a thickness of 30 μm was formed by an extrusion-laminating method (extrusion temperature: 280° C.) and a heat sealant layer having a thickness of 1 μm was formed by a gravure coating method to obtain a cover tape having the layer constitution shown in FIG. 1. The cover tape obtained was slit in a width of 5.3 mm and thereafter this slit cover tape and a PET carrier tape having a width of 8 mm were subjected to heat sealing. The resulting assembly was subjected to measurement of peeling mechanism, peel-off strength, visible light transmittance and the state of blocking when the cover tape was stored at an ambient temperature of 60° C. The results of evaluation of the characteristics obtained are shown in Table 1 with respect to the Examples and in Table 2 with respect to the Comparative Examples.

TABLE 1

|  |  | Example 1 | Example 2 | Example 3 | Example 4 |
|---|---|---|---|---|---|
| Intermediate layer formulation | Polyethylene | 100 | 100 | 100 | 100 |
|  | Polystyrene | 30 | 30 | 30 | 30 |
|  | SEBS | 45 | 45 | 7 | 0 |
|  | SEPS | 0 | 0 | 0 | 30 |
| Heat sealant layer formulation | Thermoplastic resin | Acryl 100 | VC-VA 100 | Acryl 100 | Acryl 100 |
|  | Filler | Cross-linked acryl | Silica | Cross-linked styrene | Cross-linked acryl |
|  |  | 55 | 30 | 2 | 55 |
|  | (particle size) (μm) | (7) | (3) | (12) | (7) |
| Visible light transmittance |  | 77 | 76 | 87 | 78 |
| Peel-off strength Initial value (g/mm of seal width) |  | 45 | 30 | 54 | 43 |
| State of blocking |  | ○ | ○ | ○ | ○ |
| Peeling mechanism |  | Cohesive failure | Cohesive failure | Cohesive failure | Cohesive failure |

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| Intermediate layer formulation | Polyethylene | 100 | 100 | 100 | 100 | 100 | 100 |
|  | Polystyrene | 4 | 110 | 30 | 30 | 4 | 110 |
|  | SEBS | 0 | 0 | 70 | 7 | 7 | 7 |
| Heat sealant layer formulation | Thermoplastic resin | VC-VA 100 | Acryl 100 | VC-VA 100 | Acryl 100 | VC-VA 100 | Acryl 100 |
|  | Filler | Talc | Silica | Wax | Cross-linked acryl | Silica | Cross-linked styrene |
|  |  | 70 | 0.5 | 40 | 0.5 | 30 | 2 |
|  | (particle size) (μm) | (3) | (1.4) | (10) | (30) | (0.1) | (12) |
| Visible light transmittance |  | 64 | 70 | 71 | 64 | 84 | 72 |
| Peel-off strength Initial value (g/mm of seal width) |  | 10 | 72 | 12 | 55 | 8 | 67 |
| State of blocking |  | ○ | x | ○ | x | x | ○ |
| Peeling mechanism |  | Interfacial peeling | Cohesive failure | Interfacial peeling | Cohesive failure | Interfacial peeling | Cohesive failure |

Notes to Tables 1 and 2
Heat sealing conditions: 160° C./1 kg/cm²/0.1 sec, seal width 0.4 min × 2
Peeling conditions: 180° peeling, peeling speed 300 mm/min, n = 3
The numerals in the intermediate formulation are parts by weight per 100 parts by weight of polyethylene.
The numerals in the heat sealant layer formulation are parts by weight of filler per 100 parts by weight of the thermoplastic resin.
State of blocking:
○: No blocking, TABLE 2-continued

|  | Comparative Example 1 | Comparative Example 2 | Comparative Example 3 | Comparative Example 4 | Comparative Example 5 | Comparative Example 6 |
|---|---|---|---|---|---|---| x: blocking was caused and the tape was not practical.
VC-VA: Vinyl chloride-vinyl acetate copolymer having a softening temperature of 45° C. (Dickseal A-100Z-5A manufactured by DAINIPPON INK & CHEMICALS, INC.)
Acryl: Methyl methacrylate-butyl methacrylate copolymer having a softening temperature of 60° C. (manufactured by Osaka Printing Ink MFG Co., Ltd.)
Talc: Inorganic filler comprising magnesium silicate hydrate mineral as the main component (Microace L-1 manufactured by Nippon Talc Co., Ltd.)
Wax: polyethylene wax.
Cross-linked acryl: Cross-linked acrylic resin (manufactured by Soken Kagaku K. K.)
Cross-linked styrene: Cross-linked styrene resin (manufactured by Soken Kagaku K. K.)
Silica: Inorganic filler comprising silicon dioxide as the main component.
Melt flow rate of polyethylene: 20 g/10 min
Melt flow rate of polystyrene: 22 g/10 min
SEBS: Hydrogenated styrene-butadiene-styrene block copolymer having a melt flow rate of 120 g/10 min
SEPS: Hydrogenated styrene-isoprene-styrene block copolymer having a melt flow rate of 150 g/10 min Industrial Applicability This invention provides a cover tape which is not affected by variation in sealing conditions during sealing, is free from change of various properties with the laps of time and has a stable peeling strength. This cover tape is a very advantageous cover tape for packaging electronic components which can be used as a cover material for a carrier tape system for storing and transporting electronic components.

I claim:

1. A cover tape for packaging electronic components which cover tape is heat sealable to a plastic carrier tape, characterized in that the cover tape is composed of a biaxially oriented film of any one of polyester, polypropylene and nylon; a heat sealant layer consisting of a mixture of 100 parts by weight of thermoplastic resin having a softening temperature of 40° C. to 130° C. and 1 to 60 parts by weight of a filler having a particle size of 0.2 to 20 μm; and an intermediate layer between the biaxially oriented film and the heat sealant layer, and said intermediate layer is composed of a resin composition consisting of 100 parts by weight of a polyethylene having a melt flow rate of 10 to 30 g/10 min, 5 to 100 parts by weight of a polystyrene having a melt flow rate of 10 to 30 g/10 min and 1 to 50 parts by weight of at least one member selected from the group consisting of a hydrogenated styrene-butadiene-styrene block copolymer having a melt flow rate of 30 to 250 g/min and a hydrogenated styrene-isoprene-styrene block copolymer having a melt flow rate of 30 to 250 g/10 min; said biaxially oriented film has a thickness of 5 to 30 μm, the intermediate layer has a thickness of 5 to 50 μm, and the heat sealant layer has a thickness of 0.2 to 3 μm, and wherein said resin of the intermediate layer is so constituted that the peel strength between the cover tape and the carrier tape becomes 10 to 120 g/mm of seal width.

2. The cover tape for packaging electronic components according to claim 1, characterized in that the thermoplastic resin in the heat sealant layer is a polymethacrylate or a vinyl chloride-vinyl acetate copolymer.

3. The cover tape for packaging electronic components according to claim 1, wherein the filler is composed of at least one member selected from the group consisting of silica, talc, calcium carbonate, clay, polyethylene particles, cross-linked acrylic resin particles and cross-linked styrene resin particles.

* * * * *